April 6, 1948.                S. E. BOUCHARD                2,439,357
LENS HOLDING MEANS FOR SEMIRIMLESS TENSION SPECTACLE MOUNTINGS
Filed Oct. 11, 1945
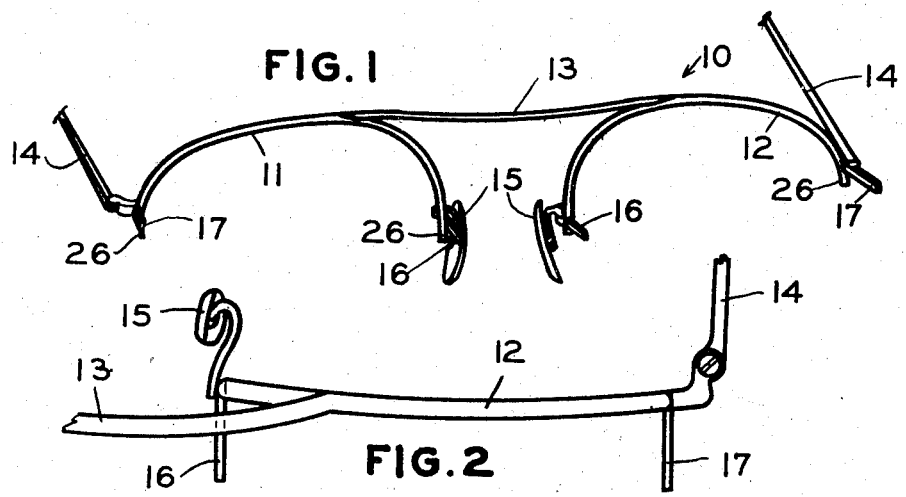
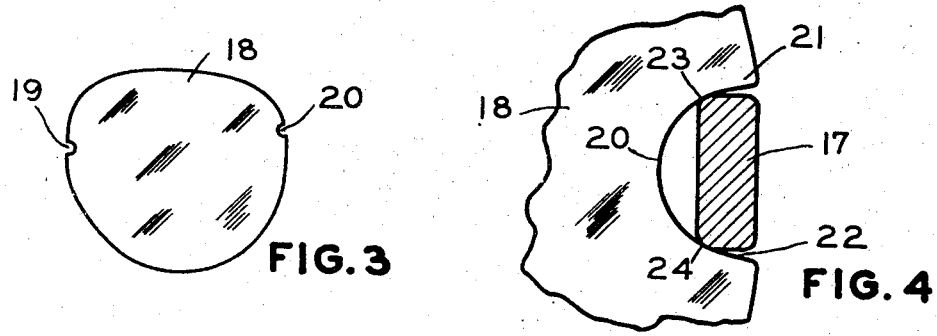
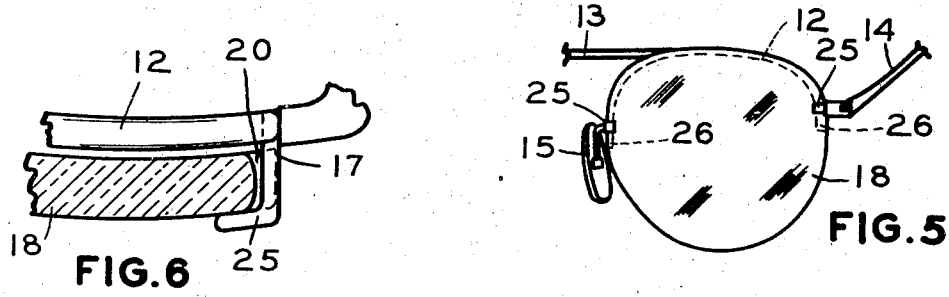
SAMUEL E. BOUCHARD
INVENTOR
BY *[signature]*
ATTORNEY Patented Apr. 6, 1948

2,439,357

UNITED STATES PATENT OFFICE 2,439,357

LENS HOLDING MEANS FOR SEMIRIMLESS TENSION SPECTACLE MOUNTINGS

Samuel E. Bouchard, Brighton, N. Y., assignor to Bausch & Lomb Optical Company, Rochester, N. Y., a corporation of New York Application October 11, 1945, Serial No. 621,698

3 Claims. (Cl. 88—47)

1

This invention relates to ophthalmic mountings and more particularly it has reference to a mounting of the semi-rimless type and the method of attaching a lens thereto without the use of screws or the like.

In ophthalmic mountings of the so-called rimless or semi-rimless types the lenses are usually secured to the mountings by means of screws which pass through apertures in the lenses. Such mountings generally have the common fault that the screws become loose after the spectacles have been put into practical use. With the mountings having straps engaging both front and rear lens surfaces, it is also difficult to mount the thicker lenses which are required for some prescriptions. Drilling screw holes near the edges of the lenses tends to weaken them so that breaks in the lenses frequently occur adjacent such holes.

My invention seeks to overcome the above-noted defects and disadvantages by providing an ophthalmic mounting of the semi-rimless type which is relatively simple in structure, efficient in operation, neat in appearance, and adapted for holding the lenses without the use of members passing through apertures formed in the lenses. A further object is to provide improved connecting means between the lenses and parts of the mountings of the type described wherein the lenses are held by resilient members in engagement therewith. Another object is to provide a mounting of the type described in which lenses of varying thicknesses may be readily mounted and detachably held by the resilience of parts of the mounting. A further object is to provide an improved method for attaching lenses of varying thicknesses to a mounting without the use of elements passed through apertures in the lenses. These and other objects and advantages reside in certain novel features of construction, arrangement, and combination of parts and in the method of constructing and combining same as will hereinafter be more fully described and pointed out in the appended claims.

Referring to the drawing:

Fig. 1 is a perspective view of a mounting embodying my invention, with temples partially shown.

Fig. 2 is an enlarged top plan view of a portion thereof.

Fig. 3 is a plan view of a lens which is adapted to be attached to the mounting.

Fig. 4 is a fragmentary enlarged view showing the relation of the lens and mounting arm.

Fig. 5 is a front view of a portion of my mounting with a lens secured thereto.

2

Fig. 6 is a fragmentary top view of the mounting and lens with the latter shown in section.

A preferred embodiment of my invention is disclosed in the drawings wherein 10 indicates, generally, an ophthalmic mounting having the two spaced, resilient frame members 11 and 12 connected by a suitable bridge means such as 13. The frame members 11 and 12 are formed of any suitable resilient material, such as metal wire, which is relatively stiff so that the lenses will not be easily removed by accidental flexing of the members. The usual temples 14 are pivotally connected to the temporal sides of the frame members while nose engaging members 15 project rearwardly from the nasal sides of the frame members.

The flexible metal arms 16 and 17 are secured, respectively, to the nasal and temporal portions of the frame members, as by soldering, for example. The arms 16 and 17 are substantially rectangular in cross section and extend forwardly from the frame members 11 and 12 as shown on the drawings. The lens 18 which is to be detachably secured to the mounting is provided with the notches 19 and 20 on its respective nasal and temporal edges. The notches, which may be made by a suitable abrading wheel, are formed with upper and lower diverging wall portions 21 and 22. The arms are positioned in the notches as shown in Fig. 4 wherein the side of the arm 17 which is adjacent the bottom of notch 20 has two spaced portions 23 and 24 in contact, respectively, with the upper and lower wall portions 21 and 22. Since only two spaced portions of the arm 17 are in engagement with the walls of the notch 20, the arm 17 is held in firm, wedging engagement with the lens so that it will be held against rocking movement relative to the arm. It will be understood, of course, that the arms are urged into engagement with the notches in the lenses by the resilience of the frame members 11 and 12, the end portions of which are sprung apart to receive the lenses.

In commercial practice, the optician will be supplied with the mountings substantially as shown in Fig. 1 with the arms 16 and 17 projecting forwardly and having a length which is greater than the thickness of the thickest lens that may be encountered in practice. After measuring the nasal and temporal edge thicknesses of a lens, the optician will cut off the ends of the arms so that they project slightly beyond the front surfaces of the lenses. The excess portion 25 will then be bent over at an angle so that it will engage the front surface of the lens when it is assembled, as shown in Fig. 6. The lens will thus be held with its rear surface in engagement with the frame member 12 and with its front surface in engagement with the portion 25. Such a structure will hold the lens and prevent it from rocking backward and forward if the mounting is properly formed. However, if the mounting is not formed or trued correctly, the lens may have a tendency to rock forwardly and backwardly. Such a tendency can be eliminated substantially by providing additional bearing support for the rear surface of the lens by extending the frame members so that they project slightly below the arms 16 and 17 as shown at 26.

From the foregoing it will be apparent that I am able to attain the objects of my invention and provide an improved ophthalmic mounting of the type described. It will be obvious that lenses of different thicknesses may be detachably secured to the mounting without the use of screws or other members passing through apertures in the lenses. The mountings will be supplied to the optician in the condition shown in Fig. 1 so that he may readily attach thereto even the extremely thick lenses which may be encountered in some prescriptions. By employing a notch in the lens which has diverging walls the lens arm may be securely held by a two point contact structure. Since the mounting is neat and attractive, it is desirable from a cosmetic standpoint. Various modifications can be made without departing from the spirit of my invention as pointed out in the appended claims.

I claim:

1. As an article of manufacture an ophthalmic mounting comprising a pair of spaced, resilient frame members, bridge means connecting the frame members, each of said members being curved so as to extend along the periphery of a lens which is adapted to be positioned against the front side of the member, each of said members having relatively straight bendable arms extending forwardly from its nasal and temporal portions, each of said arms having a substantially uniform cross sectional area throughout its length, the lengths of said arms being greater than the thickness of the thickest lenses which are to be positioned against the members whereby lenses of various thicknesses having nasal and temporal edge notches may be mounted in front of said members with the arms yieldably engaging the respective notches and the ends of the arms may be bent over at angles so as to engage the front faces of the lenses.

2. An ophthalmic mounting comprising a pair of spaced resilient frame members, bridge means connecting the members, a pair of lenses, said members positioned rearwardly of and extending, respectively, along the upper edges and partially along the nasal and temporal edges of the lenses, a flexible arm secured to and extending forwardly from the nasal and temporal portions of said members, said lenses having formed on their nasal and temporal edges notches having upper and lower diverging wall portions, said arms being positioned in the respective notches and held therein by the resilience of the members, the forward ends of the arms being bent over so as to engage the front surfaces of the lenses, the parts of the arms facing the bottoms of the notches having only spaced upper and lower portions in contact, respectively, with said upper and lower wall portions whereby the two point contact between the arms and lenses reduces the tendency of the lenses to rock about the arms as the lenses are detachably held thereby.

3. In an ophthalmic mounting having a resilient frame member positioned rearwardly of and extending along the nasal, upper, and temporal edges of a lens, the combination of flexible arms secured to and extending forwardly from the nasal and temporal portions of the member, said lens having on its nasal and temporal edges notches provided with upper and lower diverging wall portions, said arms being positioned in the respective notches and held therein by the resilience of the members, the forward ends of said arms being bent over so as to engage the front surface of the lens, said arms being constructed and formed so that only two spaced portions are in contact, respectively, with said upper and lower wall portions whereby the lenses are held against substantial rocking movement relative to the arms.

SAMUEL E. BOUCHARD.

REFERENCES CITED

The following references are of record in the file of this patent:

UNITED STATES PATENTS

| Number | Name | Date |
|---|---|---|
| 2,208,103 | Patterson | July 16, 1940 |
| 2,277,118 | Leavitt | Mar. 24, 1942 |

FOREIGN PATENTS

| Number | Country | Date |
|---|---|---|
| 461,253 | France | Oct. 24, 1913 |